Aug. 19, 1930.　　O. H. BUSE　　1,773,257
PRODUCTION OF GRANULAR SUBSTANCES
Filed Feb. 13, 1928

Inventor:
Otto H. Buse
By Byrnes Townsend & Brickenstein
his Attorneys

Patented Aug. 19, 1930

1,773,257

UNITED STATES PATENT OFFICE

OTTO H. BUSE, OF CLEVELAND, OHIO, ASSIGNOR, BY MESNE ASSIGNMENTS TO THE GRASSELLI CHEMICAL COMPANY, OF CLEVELAND, OHIO, A CORPORATION OF DELAWARE

PRODUCTION OF GRANULAR SUBSTANCES

Application filed February 13, 1928. Serial No. 254,089.

The present invention relates to a method and apparatus for the production of granular substances.

It is advantageous to be able to readily produce numerous materials, particularly chemical products, in the granular or globular form, because of the convenience of handling and the freedom from dusting of materials in that form. These and other advantages have led to a constantly increasing demand for the production of chemical products in granular form.

Those substances which are produced in the molten state or which may be melted readily without deterioration may be granulated by allowing drops of the molten material to fall through the air. This, of course, may be done by the use of towers such as are used in the production of lead shot. But to produce globular material of a desirable size, e. g., 1 to 2 mm. in diameter, inconveniently high towers would frequently be required.

The height of the structure can be decreased by spraying the material upward, thus doubling the trajectory of the droplets, but in this case the width of the building must be considerably increased. If the droplets strike any hard surface, such as the walls, ceiling or floor of the building, before complete solidification, they will agglomerate into solid masses or larger chunks which are, of course, undesirable in the production of fine granules.

In the granulating or globularizing of materials, such as sodium bisulfate, which are corrosive in their molten state, it is particularly impractical to erect structures of large dimensions, as supporting members have to be omitted from the interior.

I have found that small buildings can be used for this purpose if the walls of the building are blanketed by a swiftly moving current of air or an inert gas. This prevents the droplets from hitting the walls before they are solidified and has the added advantage of carrying away the heat of crystallization and keeping the center air space cool, which in turn produces a quicker solidification.

It is obvious that this principle could be applied to any kind of building or to any spraying process, and any such application is contemplated as being within the scope of the present invention.

For purposes of illustration, the accompanying drawing and the following description show the application of the principle of this invention to the production of globular sodium bisulfate.

Figure 1:
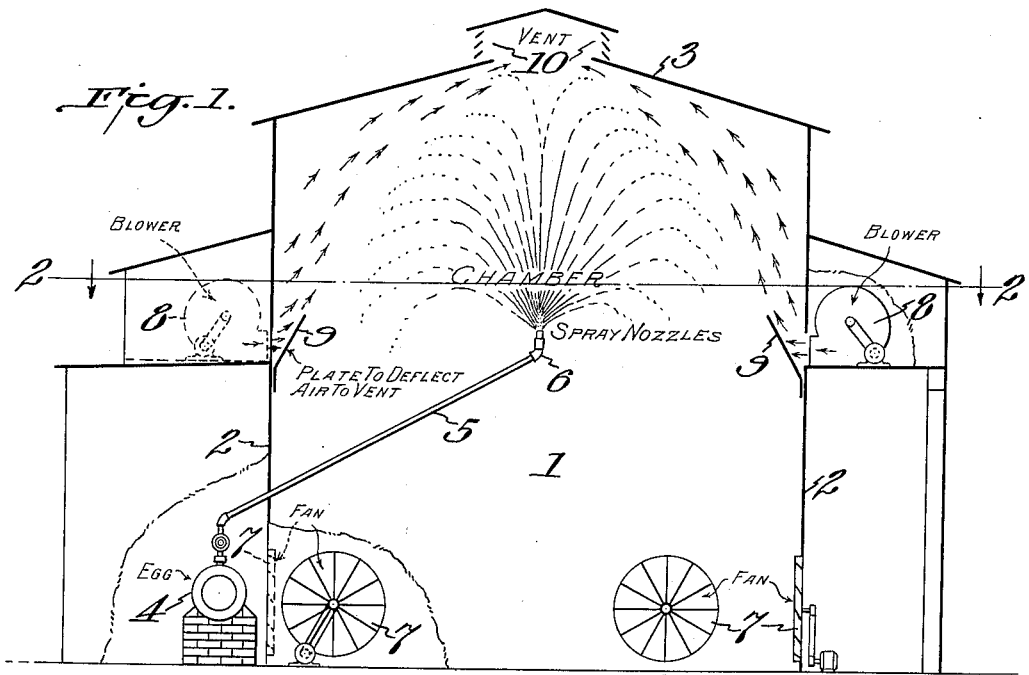

In the illustration, Fig. 1 is an elevation in partial section; and

Figure 2:
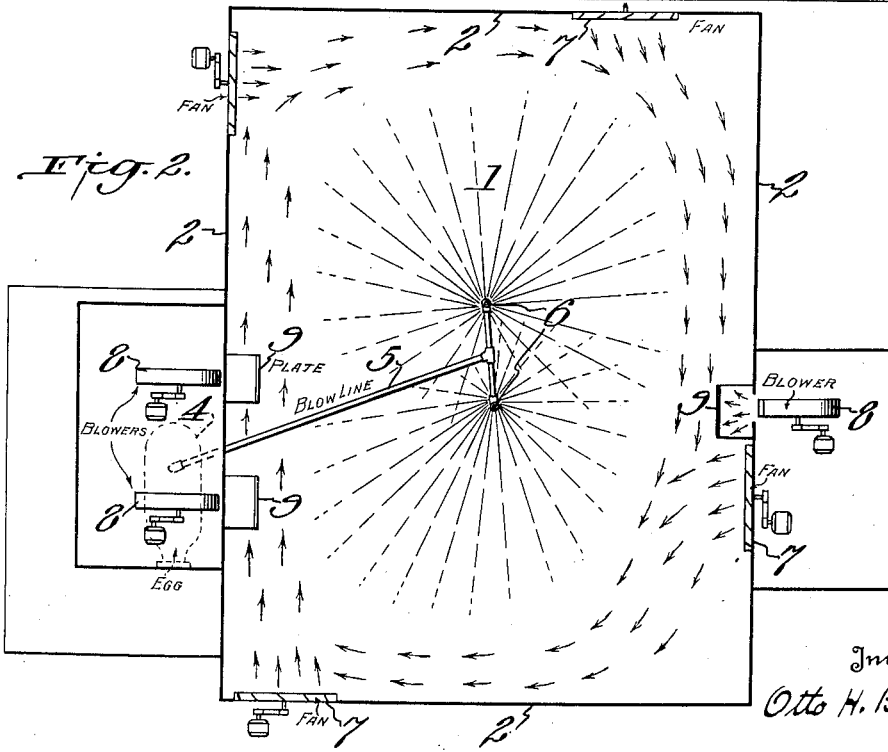

Fig. 2 is a section on the line 2—2 of Fig. 1.

The cooling space 1 is delimited by the walls 2 and roof 3 of the structure. The molten sodium bisulfate is forced from the egg or blow case 4 through pipe 5 to spray nozzles 6. Fans 7 located approximately at the lower corners of the structure, and directed approximately tangential to the periphery of the interior space, create a peripheral air current about the lower walls of the space. Blowers 8 situated centrally in the upper part of the side walls, together with deflecting plates 9, produce an upward current of air which blankets the upper part of the walls and the ceiling of the structure and passes out through medially located roof vents 10. Air from the lower peripheral current also ultimately forms a part of this upward current.

It will be obvious that the walls and ceiling of the cooling space are protected from contact with uncooled particles by means of blanketing air currents which effectively prevent any substantial amount of incrustation or agglomeration of such uncooled particles. In other words, particles which enter these blanketing currents have their path so increased in the direction of the current that they do not come into contact with the walls and ceiling of the structure until the particles have been sufficiently cooled that they will not coalesce.

It will also be obvious that the particular arrangement and number of fans or blowers, or other means of creating the desired air currents, may be varied according to the size and shape of the structure in which the granulation is carried out and according to the characteristics of the material to be granulated.

This invention will be seen to comprise the granulation of substances solid at ordinary temperatures by spraying the substances in the liquid or semi-liquid condition into a cooling space enclosed within peripheral air currents, and structures adapted to carrying such a process into effect.

I claim:

1. A method of granulating substances, solid at ordinary temperatures, which comprises spraying the substances in the liquid condition into a space containing a body of relatively stagnant air substantially surrounded by swiftly moving air currents.

2. A method of granulating sodium bisulfate which comprises spraying the sodium bisulfate in the molten condition into a space containing a body of relatively stagnant air substantially surrounded by swiftly moving air currents.

3. A method of granulating substances, solid at ordinary temperatures, which comprises upwardly spraying the substances in the liquid condition into a space containing a body of relatively stagnant air substantially surrounded by swiftly air currents.

4. A method of granulating sodium bisulfate which comprises upwardly spraying the sodium bisulfate in the molten condition into a space containing a body of relatively stagnant air substantially surrounded by swiftly moving air currents.

5. Apparatus for the granulation of substances, solid at ordinary temperatures, comprising a cooling space, means for spraying the substance in the liquid condition into said space, and means for producing swiftly moving air currents substantially parallel and adjacent to the walls forming the outer boundaries of said space.

6. Apparatus for the granulation of substances, solid at ordinary temperatures, comprising a cooling space, means for spraying the substance in the liquid condition into said space at about its center, and means for producing swiftly moving air currents substantially parallel and adjacent to the walls forming the outer boundaries of said space.

7. Apparatus for the granulation of substances, solid at ordinary temperatures, comprising a cooling space, means for upwardly spraying the substance in the liquid condition into said space at about its center, and means for producing swiftly moving air currents substantially parallel and adjacent to the walls forming the outer boundaries of said space.

8. Apparatus for the granulation of sodium bisulfate comprising a cooling space, means for spraying the sodium bisulfate in the molten condition into said space and means for producing swiftly moving air currents substantially parallel and adjacent to the walls forming the outer boundaries of said space.

9. Apparatus for the granulation of sodium bisulfate comprising a cooling space, means for spraying the sodium bisulfate in the molten condition into said space at about its center, and means for producing swiftly moving air currents substantially parallel and adjacent to the walls forming the outer boundaries of said space.

10. Apparatus for the granulation of sodium bisulfate comprising a cooling space, means for upwardly spraying the sodium bisulfate in the molten condition into said space at about its center, and means for producing swiftly moving air currents substantially parallel and adjacent to the walls forming the outer boundaries of said space.

In testimony whereof, I affix my signature.

OTTO H. BUSE.